Nov. 4, 1952 T. L. SMITH 2,616,736
GASKET
Filed Jan. 31, 1950
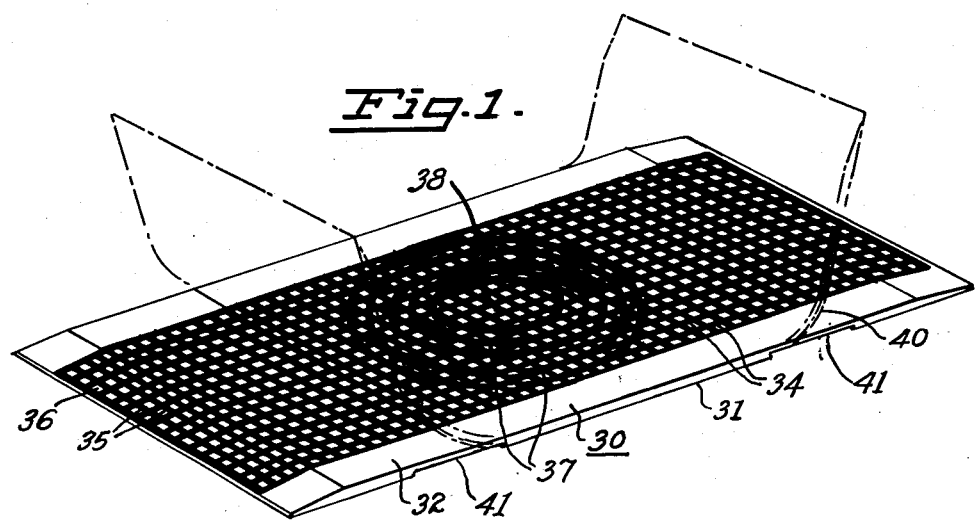
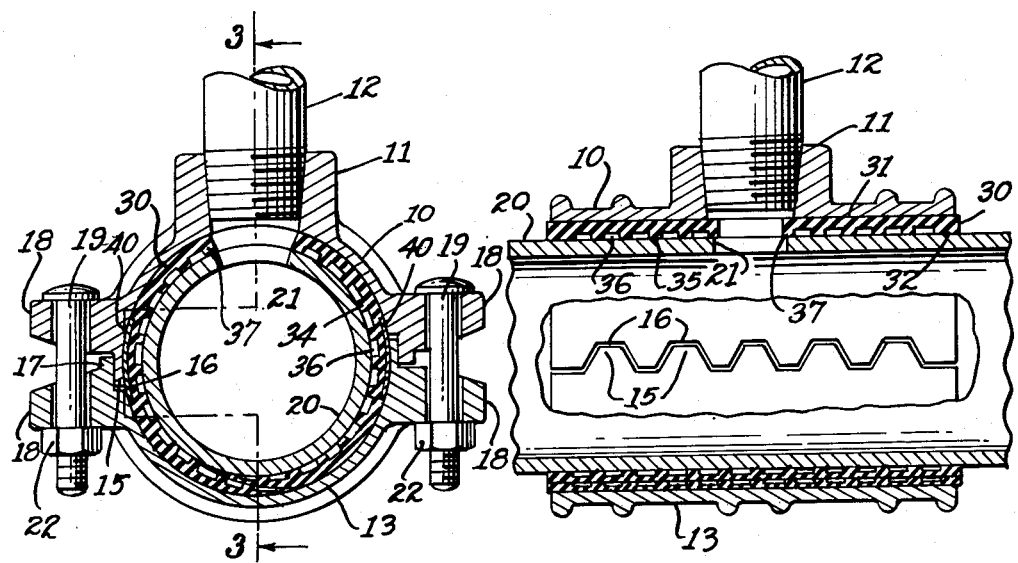
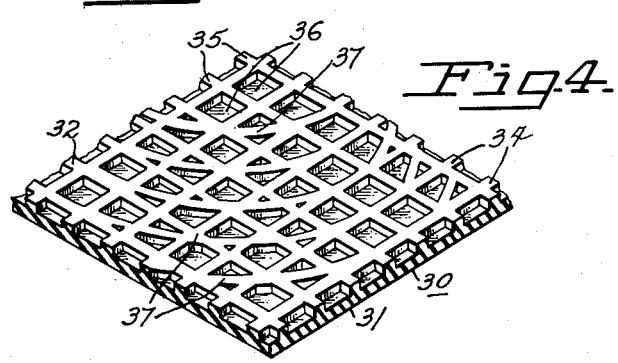
INVENTOR.
TELFORD L. SMITH
BY
ATTORNEY Patented Nov. 4, 1952

2,616,736

UNITED STATES PATENT OFFICE 2,616,736

GASKET

Telford L. Smith, South San Francisco, Calif.

Application January 31, 1950, Serial No. 141,514

7 Claims. (Cl. 288—23)

This invention relates to an improved gasket. More particularly it relates to a gasket adapted to be clamped around a pipe having an opening in its wall.

The invention solves the leakage problem encountered when clamping a clamp-on T-fitting on the wall of a pipe. For example, a hole may be bored through the wall of the pipe; then a clamp member with a threaded boss may be placed around the pipe and the threaded boss aligned with the hole in the pipe. A second smaller-diameter pipe may then be threaded into the boss. The gasket of this invention solves the problems of how to prevent leakage between the clamp member and the pipe wall.

Another problem has been the difficulty of carrying a number of gaskets to fit each diameter of pipe that may be used with the clamp-fitting. The present invention solves that problem by having a single gasket which can be cut at the time of installation to fit the size of hole in the pipe wall.

The invention solves the above problems by providing a resilient gasket, one surface of which has a network of deformable raised ribs surrounding a number of depressed pockets. Around some point, preferably the center, is a series of concentric circular ribs of the same height as the other ribs. The hole for the outlet may be cut through the gasket at this point concentric with the circular ribs. The circular ribs serve as guides for the cutting and also help prevent leaks. One or more circular ribs surround the hole in the pipe and catch any leaking fluid in the depressed pockets. The opposite side of the gasket is preferably smooth and may be provided with armor strips of malleable metal which protect the gasket from being cut or otherwise damaged when the clamp is tightened around the pipe.

A detailed illustrative embodiment will now be described in accordance with U. S. Revised Statutes, section 4888. The invention, however, is not intended to be narrowly limited by this description except as required by the appended claims.

In the drawings:

Fig. 1 is a view in perspective of the improved gasket. The solid lines show its flat position, before the armor strips are installed, and the dotted lines outline its position after the installation of the strips.

Fig. 2 is a view in elevation and in section, showing the gasket installed around a pipe between the pipe and a pipe clamp; and Fig. 3 is a view taken on the broken line 3—3 in Fig. 2. Also the gasket is broken away to show the interlocking fingers and pockets of the clamp.

Fig. 4 is an enlarged view in perspective and partly in section of a portion of the gasket shown in Fig. 1.

The invention will be described in connection with a pipe clamp of the general type shown and claimed in applicant's copending application, Serial No. 4,317, filed January 26, 1948, although the gasket is not limited to use with this type of clamp. The clamp shown is made in two pieces. The upper piece 10 has an outlet or boss 11 in which a small pipe 12 may be threaded to provide a T-fitting. The lower piece 13 is preferably imperforate. Each half section 10 and 13 has two diametrically opposed rows of fingers 15 and pockets 16, and there is a flange 17 in back of one row of each half-section. When the clamp is installed around the pipe 20 (see Figs. 2 and 3), the complementary fingers 15 and pockets 16 interlock and the flanges 17 limit the sidewise movement. Each section has lugs 18 which receive the bolts 19 used to tighten the clamp section together.

When it is desired to add a T joint to a solid-walled pipe 20, a hole 21 is bored in the pipe wall, and the clamp is set around the pipe 20 with a gasket 30 between the pipe and the clamp. The pipe opening 21 and the boss opening 11 are lined up; and then the clamp is tightened by threading nuts 22 on the bolts 19. The two clamp sections 10 and 13 are moved in toward each other and are tightened around the pipe 20, pressing the gasket 30 in against the walls of the pipe.

The gasket 30 of this invention is a substantially flat mat of rubber or synthetic rubber. Its outer surface 31—the one which fits against the clamp—may be smooth, but the inner surface 32 which fits against the pipe has a network of raised lengthwise ribs 34 and a series of raised ribs 35 set crosswise in relation to the lengthwise ribs 34. A large number of water-trapping pockets 36 are formed between the ribs 34 and 35. Any water which might otherwise leak out between the pipe and the clamp will not leak through to the outside because most of the ribs fit tightly against the pipe wall. If one rib is not a tight fit some one or more of the adjacent ribs will be a tight fit and will catch the water.

The ribbing aids in effecting a tight fit against the pipe. The comparatively narrow width of the ribs makes them easier to compress or deflect under the pressure between the clamp and the pipe. If the gasket surface were smooth, the applied force would have greater difficulty in effecting a seal. The ribbing effects a pressure concentration on the ribs and any leak is limited to a small area of depressed pockets and does not get through to the outside.

In addition to the system of cross-ribbing, the present invention provides a series of circular ribs 37 concentrically arranged. Preferably, the center 38 for the concentric ribs 37 is the center of the gasket, as that location will leave the most gasket surface surrounding the hole when made. The circular ribs 37 and the cross ribs 34 and 35 are all molded integrally into the gasket, and all the ribs are the same height. As shown in Fig. 1, there are five of these circular ribs 37, but there may be more or fewer of them. When installed the remaining concentric ribs which surround the hole 21 in the pipe wall will prevent any water from spreading out very far radially. Even if water should be able to leak past one rib or in between two of the straight ribs, the next circular rib or cross rib will dam it up.

In order to prevent the clamp from chewing up the gasket, strips 40 of copper or other malleable metal are inserted in recesses 41 in the reverse face of the gasket and are adapted to lie opposite the interlocking fingers and pockets. The strips 40 are preferably curved to correspond with the final shape of the gasket around the pipe, so that when they are installed, the gasket will assume the position shown in dotted lines in Fig. 1. The teeth 15 and 16 will slide over the metal surface of the armor strip 40, and the clamp may bend it in slightly to correspond with the size of the pipe, but since it does not touch the rubber, there will be no holes made in the gasket when the clamp is tightened.

In operation the gasket is furnished with the recesses 41 and with the strips 40 cemented in. The hole is cut in the gasket to correspond with the hole through the pipe and the clamp boss. The gasket may be cemented inside the upper clamp, if desired. Then the T-clamp member is placed over the pipe with the holes in alignment. The other clamp member may then be placed on the other side of the pipe, and the gasket overlapped inside it. Or if the gasket is too short to overlap along the mid section of the pipe, a filler piece may be placed adjacent the ends of the gasket to compress it. The metal strips 40 prevent the interlocking fingers 15 and pockets 16 from chewing up the gasket when the clamp members are closed together. When closed, the pressure between the clamp and the pipe is concentrated along the ribs, which deform where they contact the pipe and act as effective barriers against leaks.

I claim:

1. A gasket adapted for perforation for use in sealing around a hole in a pipe when conformed to said pipe by a clamp-on member, said gasket comprising a sheet of rubber having on one surface a plurality of criss-crossed ribs substantially rectangular in cross-section and of an even height, and a plurality of concentric full circle ribs of increasing diameter also substantially rectangular in cross-section, and of an even height, said circle ribs and said criss-crossed ribs crossing each other and lying at the same height, so as to form between them a plurality of liquid-trapping pockets, said circle ribs serving as guides for the cutting of an opening to be conformed to the size of the hole in the pipe, the ribs lying outside the opening cooperating with the rectangular ribs and the pockets to seal liquid around said opening.

2. The gasket of claim 1 in which the side of the sheet not having said ribs is substantially smooth.

3. The gasket of claim 2 in which the smooth side of said sheet has malleable metal strips fitted substantially flush in recesses on said smooth side.

4. The gasket of claim 1 in which the ends of the sheet are straight tapered so that when the gasket is folded around a pipe the tapered portions may overlie each other and together be of approximately the same thickness as the gasket itself.

5. A gasket adapted for perforation for use in sealing around a hole in a pipe when conformed to said pipe by a clamp-on member, said gasket comprising a sheet of rubber having on one surface a plurality of criss-crossed ribs of an even height, and a plurality of concentric full circle ribs of increasing diameter of the same height as said criss-crossed ribs, said circle ribs and said criss-crossed ribs crossing each other and lying at the same height, so as to form between them a plurality of liquid-trapping pockets, an opening adapted to fit over the hole in the pipe being formed concentrically inside said circle ribs, whereby said circle ribs act to seal the space around said opening, in cooperation with said criss-crossed ribs.

6. The gasket of claim 5 in which the side of the sheet not having the ribs is generally smooth and is provided with recesses and in which malleable metal strips fit in said recesses substantially flush with said smooth surface and protect the gasket from damage by the clamp which holds it around the pipe.

7. The gasket of claim 5 in which the ends of the sheet are straight tapered, so that when the gasket is installed around the pipe, the tapered portions will overlie each other and together have approximately the same total thickness as the gasket itself.

TELFORD L. SMITH.

REFERENCES CITED

The following references are of record in the file of this patent:

UNITED STATES PATENTS

| Number | Name | Date |
|---|---|---|
| 164,444 | Grilley | June 15, 1875 |
| 629,315 | Dorticus | July 18, 1899 |
| 871,178 | Ostander | Nov. 19, 1907 |
| 1,518,521 | Kraft | Dec. 9, 1924 |
| 2,456,262 | Fields | Dec. 14, 1948 |

FOREIGN PATENTS

| Number | Country | Date |
|---|---|---|
| 2,225 | Great Britain | June 1, 1880 |
| 150,255 | Great Britain | Sept. 2, 1920 |
| 563,175 | Germany | Nov. 2, 1932 |